United States Patent
Um

[19]

[11] Patent Number: 5,877,756
[45] Date of Patent: Mar. 2, 1999

[54] TERMINAL DEVICE FOR A VIDEO-ON-DEMAND SYSTEM HAVING A HOTKEY FUNCTION AND A METHOD THEREOF

[75] Inventor: Tae-bum Um, Seoul, Rep. of Korea

[73] Assignee: Samsung Electronics Co., Ltd., Kyungki-do, Rep. of Korea

[21] Appl. No.: 760,274

[22] Filed: Dec. 4, 1996

[30] Foreign Application Priority Data

Jul. 15, 1996 [KR] Rep. of Korea .................. 1996 28634

[51] Int. Cl.$^6$ ............................... G06F 3/00; H04N 7/14
[52] U.S. Cl. .............................. 345/329; 345/327; 348/7; 348/13; 395/200.49
[58] Field of Search ................................ 345/326, 327, 345/328, 329, 330, 331, 333, 335; 348/7, 12, 13; 395/200.49, 200.52

[56] References Cited

U.S. PATENT DOCUMENTS

| | | | |
|---|---|---|---|
| 5,218,708 | 6/1993 | Kanbayashi et al. | 395/200.49 |
| 5,414,455 | 5/1995 | Hooper et al. | 348/7 |
| 5,442,390 | 8/1995 | Hooper et al. | 348/7 |
| 5,524,195 | 6/1996 | Clanton, III et al. | 345/327 |
| 5,548,729 | 8/1996 | Akiyoshi et al. | 395/200.52 |
| 5,594,661 | 1/1997 | Bruner et al. | 395/200.49 |
| 5,621,456 | 4/1997 | Florin et al. | 348/7 |
| 5,664,220 | 9/1997 | Itoh et al. | 395/826 |
| 5,675,738 | 10/1997 | Suzuki et al. | 395/200.49 |

*Primary Examiner*—Raymond J. Bayerl
*Assistant Examiner*—X. L. Bautista
*Attorney, Agent, or Firm*—Sughrue, Mion, Zinn, Macpeak & Seas, PLLC

[57] ABSTRACT

A terminal device in a video-on-demand system is provided. The terminal device is connected to a server via a network, and information screens are displayed by the terminal device in accordance with information screen data transmitted from the server. The terminal device contains a memory, a display, an input device, and a controller. The memory stores selection information corresponding to a particular information screen of the information screens, the display displays the particular information screen, and the input device inputs a selection command and a retrieval command. The controller generates the selection information and stores the selection information in the memory in response to the selection command. Furthermore, the controller reads the selection information from the memory in response to the retrieval command. Also, the controller outputs a request command to the server after reading the selection information from the memory, and the request command requests the server to transmit particular information screen data corresponding to the particular information screen so that the particular information screen can be promptly displayed on the display. Therefore, information on the information screen can be promptly provided to a user, thereby preventing service delay and reducing connect-time fees charged by the network.

23 Claims, 3 Drawing Sheets

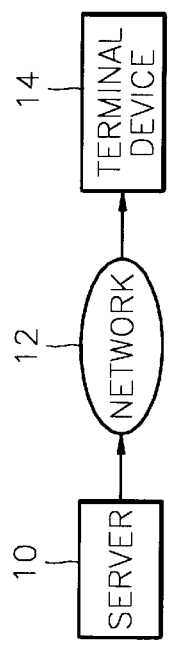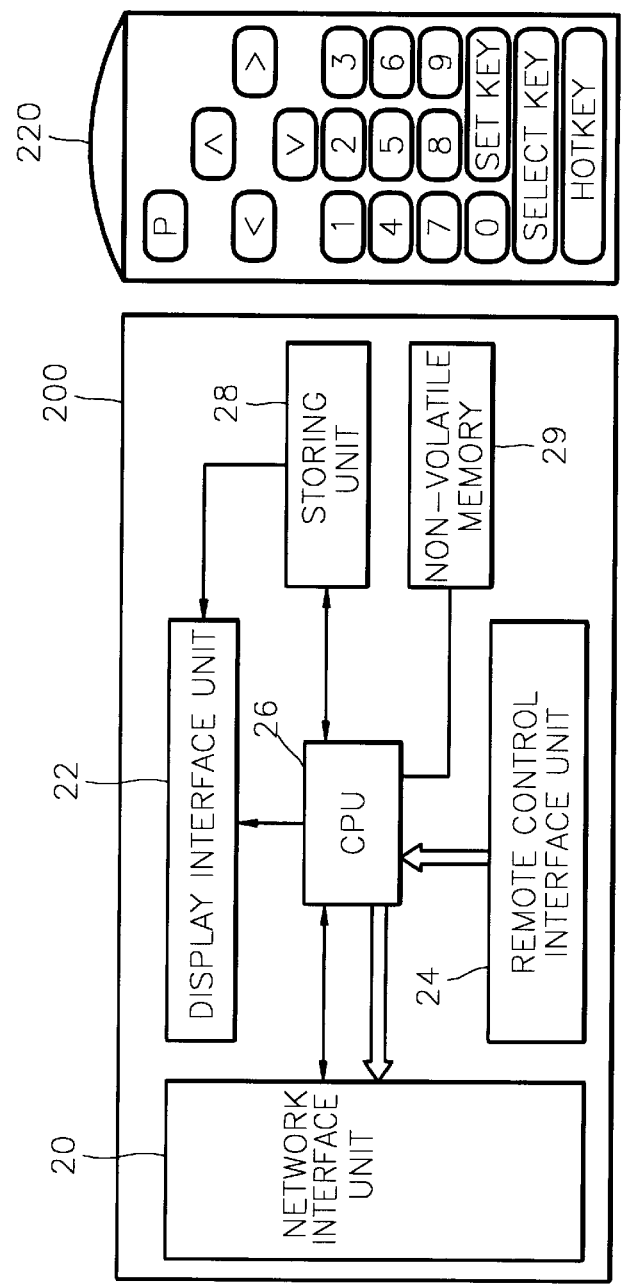

TERMINAL DEVICE FOR A VIDEO-ON-DEMAND SYSTEM HAVING A HOTKEY FUNCTION AND A METHOD THEREOF

RELATED APPLICATIONS

The present application is based on Korean Application No. 28634/1996 which is incorporated herein by reference for all purposes.

FIELD OF THE INVENTION

The present invention relates to a video-on-demand (VOD) system. More particularly, the present invention relates to a terminal device of the VOD system which has a hotkey function for promptly displaying a desired menu screen.

BACKGROUND OF THE INVENTION

A VOD system is a general term for a communication network service in which video information is instantaneously provided to a user upon the request of the user. The elementary structure of a VOD service system is illustrated in FIG. 1.

Specifically, the VOD service system contains a server 10, a network 12, and a terminal device 14. The server 10 provides image data to the network 12 in response to a command received from a user, and the network 12 transmits the image data to the terminal device 14. The device 14 restores and reproduces the image data so that it can be perceived by the user.

In order to generate a command from a user, the terminal device 14 receives menu data from the server 10 via the network 12 and displays various menus. Then, the user can select options from the menus, and in turn, the device 14 requests additional menu data to be supplied from the server 10. Thus, by selecting the appropriate options on the menus, the user can navigate to a desired service screen.

On the other hand, the user may display a desired service screen without navigating through a series of menus. Specifically, if the user knows a direct code which identifies the desired service screen, the user can directly obtain the service screen by entering the code.

If the terminal device 14 is instructed by the user to receive menu data from the network 12 or server 10 in order to navigate to a desired service screen, the device 14 must continuously receive menu data and display various menus until the desired service screen is found. Thus, if the menu data contains a large amount of graphics oriented data, the amount of service delay significantly increases, and thus, the time required to be connected to the network 12 likewise increases. Accordingly, the connect-time fees incurred by the user escalate, and the cost of receiving the desired service screen becomes less affordable.

However, if a direct code is input by the user to immediately display the desired service screen, the amount of time necessary to be connected to the network 12 decreases. However, the user must remember which direct code corresponds with which service screen and must maintain a list of codes for newly added services. Consequently, relying on direct codes for accessing the service screens is inconvenient.

In some systems, direct codes for various service screens may be displayed in various menus to allow the user to easily identify the direct code. However, there is a limit to the number of codes which can be shown. Moreover, even if all of the direct codes for all of the service screens which can be potentially accessed from the currently displayed menu are shown in the menu, an apparatus is required to search for the direct codes when a menu is displayed. Accordingly, the navigator becomes complicated, and the service provided by the system is deteriorated.

SUMMARY OF THE INVENTION

An object of the present invention is to provide a terminal device for a video-on-demand (VOD) system having a hotkey function which promptly accesses menu information necessary for connecting the terminal device to a desired service. Specifically, hotkey information is stored in the terminal device in accordance with a predetermined hotkey and a menu screen for receiving the desired service is promptly searched using the predetermined hotkey.

In order to accomplish the above objects, a terminal device in a video-on-demand system which is connected to a server via a network is provided. In the system, information screens are displayed by said terminal device in accordance with information screen data transmitted from said server. Specifically, the terminal device comprises: a memory for storing selection information corresponding to a particular information screen of said information screens; a display for displaying said particular information screen; an input device for inputting a selection command and a retrieval command; and control means for generating said selection information and storing said selection information in said memory in response to said selection command and for reading said selection information from said memory in response to said retrieval command, wherein said control means outputs a request command to said server after reading said selection information from said memory and wherein said request command requests said server to transmit particular information screen data corresponding to said particular information screen so that said particular information screen can be promptly displayed on said display.

In order to further achieve the above objects, a method for promptly displaying a particular information screen of information screens on a display of a terminal device in a video-on-demand system is provided. In the system, the terminal device is connected to a server via a network, and the information screens are displayed by the terminal device in accordance with information screen data transmitted from the server. In particular, the method comprises the steps of: (a) displaying said particular information screen on said display; (b) inputting a selection command; (c) inputting a retrieval command; (d) generating selection information which corresponds to said particular information screen and storing said selection information in a memory in response to said selection command; (e) reading said selection information from said memory in response to said retrieval command; and (f) outputting a request command to said server after reading said selection information from said memory, wherein said request command requests said server to transmit particular information screen data corresponding to said particular information screen so that said particular information screen can be promptly displayed on said display.

BRIEF DESCRIPTION OF THE DRAWINGS

The above objects and advantages of the present invention will become more apparent by describing in detail preferred embodiments thereof with reference to the attached drawings in which:

FIG. 1 is a diagram of the elementary structure of a video-on-demand (VOD) system;

FIG. 2 is a diagram of a terminal device of a video-on-demand (VOD) system according to one embodiment of the present invention;

DETAILED DESCRIPTION OF THE INVENTION

Figure 3:
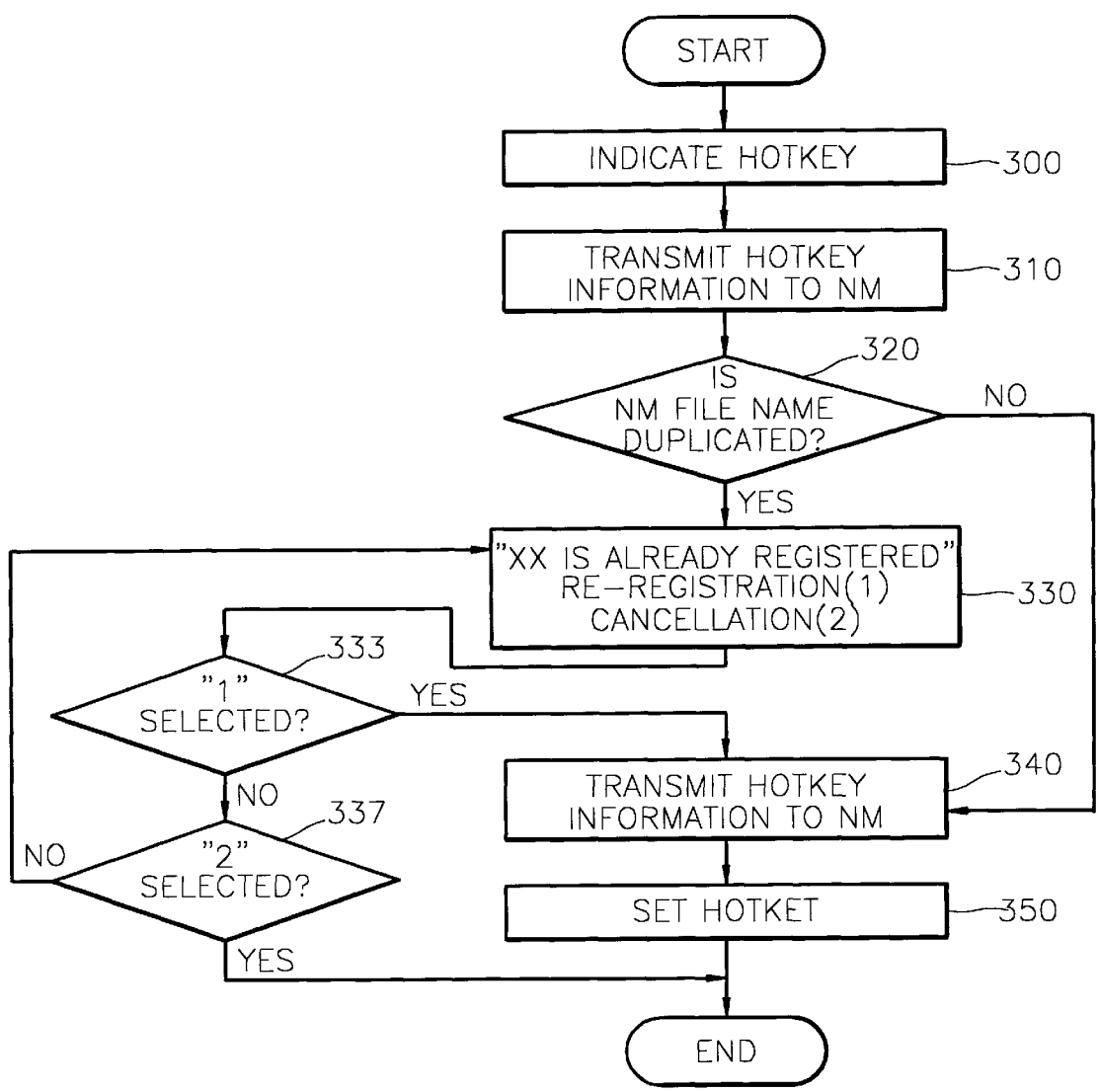
FIG. 3 is a flow chart illustrating a method for setting a hotkey in a terminal device according to one embodiment of the present invention.

The following description of the preferred embodiments discloses specific circuit configurations, data values, and components. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to such specific features. Furthermore, the descriptions of various features and structures of the present invention which would be known to one skilled in the art are omitted for the sake of clarity and brevity.

An example of a video-on-demand (VOD) system according to one embodiment of the present invention is shown in FIG. 2. Specifically, the system comprises a terminal device 200 and a remote controller 220. The terminal device 200 includes a network interface unit 20, a display interface unit 22, a remote control interface unit 24, a central processing unit (CPU) 26, a storing unit 28, and a non-volatile memory 29.

The network interface unit 20 interfaces with a network to which the device 200 is connected, and the display interface unit 22 is used to display data received from a server or the network. Furthermore, the remote control interface unit 24 receives information transmitted from the remote controller 220 by a user so that the device 200 can process such information.

The CPU 26 controls the major operations of the terminal device 200, and the storing unit 28 stores various programs associated with video-on-demand (VOD) services. For example, the various programs may include a menu navigator ("MN") and a non-volatile memory manager ("NVRAM manager" or "NM"). The menu navigator is a software module which receives user commands from the remote controller 220 and displays a menu screen via the display interface unit 22 based on such commands. The NVRAM manager is an operating system for managing information or menu data which relates to a menu screen. For instance, the NVRAM manager may contain a software module which stores the information in the nonvolatile memory 29 in accordance with a hotkey and/or which reads the information from the memory 29 according to a hotkey. Furthermore, the NVRAM manager may perform the above operations by interfacing with the menu navigator.

As described above, the non-volatile memory 29 stores information which is set by a hotkey on the remote controller 220. In addition to the hotkey, the remote controller 220 comprises numeric keys, a setkey, a select key, and directional arrow keys.

The operation of the device shown in FIG. 2 will be described below. The terminal device 200 is connected to a server via the network interface unit 20, receives information corresponding to a menu screen, and displays the information via the display interface unit 22.

In order to identify or "tag" a frequently used menu screen or service screen so that it can be quickly retrieved in the future, the user may set a hotkey which corresponds to such menu screen via the remote controller 220. When the hotkey is set, the NVRAM manager stores the hotkey information corresponding to the menu screen in the non-volatile memory 29. The method in which the hotkey is set will be explained below in conjunction with FIG. 3.

In order to set a hotkey for a menu screen currently displayed by the terminal device 200, the user designates a desired hotkey by depressing the set key, the hotkey, at least one numeric key, and the select key (step 300). In this instance, the terminal generates corresponding hotkey information to be potentially stored in the non-volatile memory 29. The hotkey information may comprise an NVRAM manager file name, a message code, and a menu screen file name.

The NVRAM manager file name comprises at least numeric information which corresponds to the depressed numeric key(s) of the remote controller 220. Such file name is used to identify the hotkey information if it is subsequently stored in the non-volatile memory 29.

The message code is an instruction code which is used when the hotkey information is about to be stored in the nonvolatile memory 29. Specifically, when the message code equals a first value (e.g. "1"), the terminal device 200 may be instructed to inform the user if the NVRAM manager file name currently selected by the user has the same value as an NVRAM manager file name already stored in the memory 29. (In such instance, the message code is a "setting code"). On the other hand, when the message code equals a second value (e.g. "2"), the NVRAM manager file name currently selected by the user may automatically overwrite hot key information which is already stored in the memory 29 and which has the same NVRAM manager file name as the currently selected file name. (In such instance, the message code is a "compulsory reset code").

The menu screen file name is a particular number or code which corresponds to the particular menu screen which is currently displayed. Furthermore, the menu screen file name is used to identify the particular menu screen when the terminal device 200 subsequently requests to receive such menu screen from the server.

After the hotkey has been designated in step 300, the menu navigator combines the message code with the menu screen file name. Then, the message code and the menu screen file name are combined with the NVRAM manager file name to produce the hotkey information, and the menu navigator transmits the hotkey information to the NVRAM manager (step 310). The hot is key information which is transmitted to the NVRAM manager may have the following form: [message code, NVRAM manager file name, menu screen file name].

After receiving the hotkey information and assuming that the message code corresponds to the "setting code" and not the "compulsory message code" described above, the NVPAM manager determines whether or not the received hotkey information has an NVRAM manager file name which equals the NVRAM manager file name of hotkey information that is already stored in the nonvolatile memory 29 (step 320). Then, the NVRAM manager reports the result of the determination to the menu navigator. If the NVRAM manager file name is not already stored in the memory 29, the NVRAM manager stores the new hotkey information in the memory 29 under the NVRAM manager file name and informs the menu navigator that the hotkey information has been stored. Then, a message informing the user that the hotkey has been set is displayed (step 350).

On the other hand, if the NVRAM manager file name is already stored in the memory 29, a message "XX is already registered" is displayed on the screen. (The term "XX" corresponds to the NVRAM manager file name which has currently been input by the user via the remote controller 220). Furthermore, a menu containing the options of re-registering the hotkey information (e.g. "re-registration (1)") or cancelling the registration of the hotkey information (e.g. "cancellation (2)") is displayed (step 330). Accordingly, the terminal device 200 prompts the user to input the appropriate command (e.g. "1" or "2") via the remote controller 220.

If the user desires to re-register the hotkey information and presses the numeric key "1" on the controller 220 (step 333), the menu navigator inserts the message code which corresponds to the compulsory reset code into the hot key information and transmits the hotkey information to the NVRAM manager (step 340). Then, the NVRAM manager overwrites the hotkey information previously stored under the same NVRAM manager file name by storing the new hotkey information under such file name. Then, the NVRAM manager transmits the result to the menu navigator, and a message that the new hotkey information has been set is displayed (step 350).

If the user desires to cancel the registration of the hotkey information and presses the numeric key "2" on the controller 220 (step 337), the routine ends. Alternatively, before the routine ends, the terminal device 200 may display the hotkey information previously stored in the memory 29 under the NVRAM manager file name so that the user can determine the hotkey information which is stored under such file name.

In order to retrieve a menu screen which corresponds to a hotkey that has been previously set, the user depresses the numeric keys on the remote controller 220 which corresponds to the NVRAM manager file name that relates to the appropriate hotkey information. Then, the terminal device 200 determines whether or not the NVRAM manager file name is stored in the non-volatile memory 29.

Figure 4:
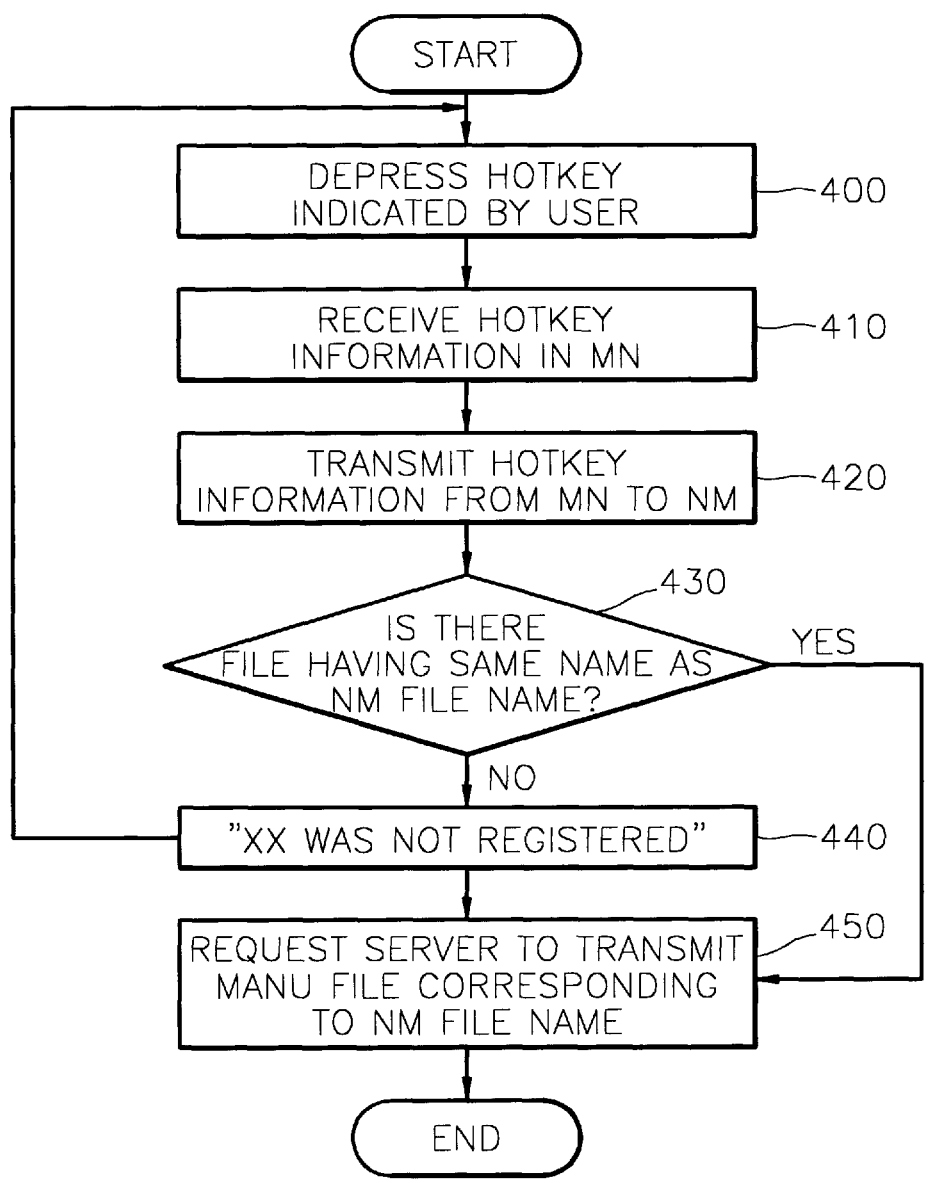
FIG. 4 is a flow chart illustrating a method for retrieving a menu screen by using the hotkey in the terminal device according to one embodiment of the present invention.

If the file name is not stored in the memory 29, the terminal device displays a message informing the user of such fact. On the other hand, if the NVRAM manager file name is stored in the memory 29, the terminal device 200 outputs a command requesting the server to transmit the information for the menu screen corresponding to the NVRAM manager file name. The routine for requesting the information relating to the menu screen is illustrated in FIG. 4.

As shown in the figure, the hotkey and at least one numeric key corresponding to a desired menu screen are depressed (step 400), and the number corresponding to the depressed numeric key(s) forms at least part of an NVRAM manager file name. Then, the menu navigator receives the NVRAM manager file name (step 410) and transmits such information to the NVRAM manager (step 420).

Upon receiving the current NVRAM manager file name, the NVRAM manager determines if any of the hotkey information stored in the non-volatile memory 29 has the same NVRAM manager file name as the current NVRAM manager file name (step 430). If none of the hotkey information has the same file name, a message "XX was not registered" is displayed (step 440), and the routine returns to step 400. On the other hand, if a hotkey information has the same file name, the terminal device 200 outputs a command to the server requesting that the data for the menu screen corresponding to the hotkey information be transmitted (step 450). In order to generate a command which identifies the appropriate menu screen, the device 200 evaluates the menu screen file name contained in the hotkey information stored in the memory 29.

In the above-described terminal device, data relating to a desired menu screen is promptly retrieved from a server based on hotkey information which has been previously stored. Therefore, service delays associated with the retrieval of such data can be eliminated and the connect-time fees charged by a network can be reduced.

In the embodiments described above, the NVRAM manager file name is generated in accordance with the depression of numeric keys on the remote controller 220. However, such file name may be generated based on alpha-numeric keys or a dedicated set of keys on the remote controller 220. Furthermore, the type of input device used by the terminal device is not limited to the remote controller but may include an input device which is connected to or integral with the terminal device. In addition, the NVRAM manager and the menu navigator are created via software, but such features could alternatively be created via hardware.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A terminal device in a video-on-demand system which is connected to a server via a network, wherein information screens are displayed by said terminal device in accordance with information screen data transmitted from said server and wherein said terminal device comprises:

a memory for storing selection information corresponding to a particular information screen of said information screens;

a display for displaying said particular information screen;

an input device for inputting a selection command and a retrieval command; and control means for generating said selection information and storing said selection information in said memory in response to said selection command and for reading said selection information from said memory in response to said retrieval command, wherein said control means outputs a request command to said server after reading said selection information from said memory, wherein said request command requests said server to transmit particular information screen data corresponding to said particular information screen so that said particular information screen can be promptly displayed on said display, wherein said selection information comprises:

a first user defined file name which corresponds to information contained in said selection command input via said input device; and a particular information screen file name which contains a distinguishing code for distinguishing said particular information screen from a remainder of said information screens.

2. The terminal device as claimed in claim 1, wherein said control means generates said selection information by generating said particular information screen file name when said particular information screen is currently being displayed on said display and combining said first user defined file name and said particular information screen file name.

3. The terminal device as claimed in claim 1, wherein control means generates said request command based on said particular information screen file name of said selection information.

4. The terminal device as claimed in claim 3, wherein said input device comprises a keypad and wherein said selection command is input by depressing at least one particular key on said keypad.

5. The terminal device as claimed in claim 3, wherein said retrieval command corresponds to a second user defined file name, and
    wherein said control means determines whether said second user defined file name equals said first user defined file name of said selection information stored in said memory by comparing said second user defined file name with said first user defined file name.

6. The terminal device as claimed in claim 5, wherein said control means reads said selection information from said memory, obtains said particular information screen file name from said selection information, and generates said request signal based on said particular screen file name when said second user defined file name equals said first user defined file name.

7. The terminal device as claimed in claim 6, wherein said control means compares said second user defined file name with said first user defined file name and displays a message on said display when said second user defined file name does not equal said first user defined file name, and
    wherein said message informs said user that said second user define file name does not correspond to said selection information stored in said memory.

8. The terminal device as claimed in claim 6, wherein said memory stores at least one additional selection information respectively containing at least one additional user defined file name and respectively corresponding to at least one additional information screen,
    wherein said control means compares said second user defined file name with said first user defined file name and said at least one additional user defined file name,
    wherein said control means displays a message on said display when said second user defined file name does not equal said first user defined file name and said at least one additional user defined file name, and
    wherein said message informs said user that said second user define file name does not correspond to said selection information and said at least one additional selection information stored in said memory.

9. The terminal device as claimed in claim 1, wherein said control means determines whether said selection information conflicts with previous selection information previously stored in said memory based on whether said first user defined file name of said selection information equals a previous user defined file name of said previous selection information, and
    wherein said control means stores said selection information in said memory if said selection information does not conflict with said previous selection information.

10. The terminal device as claimed in claim 9, wherein said control means does not store said selection information in said memory if said selection information conflicts with said previous selection information.

11. The terminal device as claimed in claim 9, wherein said control means stores said selection information in said memory if said selection information conflicts with said previous selection information and said control means is operating in an overwrite mode, and
    wherein said control means does not store said selection information in said memory if said selection information conflicts with said previous selection information and said control means is operating in a non-overwrite mode.

12. The terminal device as claimed in claim 11, wherein said control means displays a message on said display informing a user that said selection information conflicts with said previous selection information when said selection information conflicts with said previous selection information,
    wherein said control means enables said user to input one of an overwrite mode command and a non-overwrite mode command to said control means via said input device, and
    wherein said overwrite mode command places said control means in said overwrite mode and said non-overwrite mode command places said control means in said non-overwrite mode.

13. A method for promptly displaying a particular information screen of information screens on a display of a terminal device in a video-on-demand system, wherein said terminal device is connected to a server via a network, said information screens are displayed by said terminal device in accordance with information screen data transmitted from said server, and said method comprises the steps of:
    (a) displaying said particular information screen on said display;
    (b) inputting a selection command;
    (c) inputting a retrieval command;
    (d) generating selection information which corresponds to said particular information screen and storing said selection information in a memory in response to said selection command;
    (e) reading said selection information from said memory in response to said retrieval command; and
    (f) outputting a request command to said server after reading said selection information from said memory, wherein said request command requests said server to transmit particular information screen data corresponding to said particular information screen so that said particular information screen can be promptly displayed on said display,
wherein said selection information comprises:
    a first user defined file name which corresponds to information contained in said selection command; and
    a particular information screen file name which contains a distinguishing code for distinguishing said particular information screen from a remainder of said information screens.

14. The method as claimed in claim 13, wherein said step (d) comprises the steps of:
    (d1) generating said particular information screen file name when said particular information screen is currently being displayed on said display; and
    (d2) combining said first user defined file name and said particular information screen file name.

15. The method as claimed in claim 13, wherein said step (f) comprises the step of:
    (f1) generating said request command based on said particular information screen file name of said selection information.

16. The method as claimed in claim 15, wherein said retrieval command corresponds to a second user defined file name, and wherein said step (f) further comprises the step of:

(f1) determining whether said second user defined file name equals said first user defined file name of said selection information stored in said memory by comparing said second user defined file name with said first user defined file name.

17. The method as claimed in claim 16, wherein said step (f) further comprises the steps of:

(f2) reading said selection information from said memory, obtaining said particular information screen file name from said selection information, and generating said request signal based on said particular screen file name when said second user defined file name equals said first user defined file name.

18. The method as claimed in claim 17, wherein said step (d) further comprises the step of:

(d1) storing at least one additional selection information respectively containing at least one additional user defined file name and respectively corresponding to at least one additional information screen, and wherein said step (f) further comprises the steps of:

(f2) comparing said second user defined file name with said first user defined file name and said at least one additional user defined file name; and (f3) displaying a message on said display when said second user defined file name does not equal said first user defined file name and said at least one additional user defined file name, wherein said message informs said user that said second user define file name does not correspond-to said selection information and said at least one additional selection information stored in said memory.

19. The method as claimed in claim 17, wherein said step (f) further comprises the steps of:

(f2) comparing said second user defined file name with said first user defined file name; and (f3) displaying a message on said display when said second user defined file name does not equal said first user defined file name, wherein said message informs said user that said second user define file name does not correspond to said selection information stored in said memory.

20. The method as claimed in claim 13, wherein said step (d) comprises the steps of:

(d1) determining whether said selection information conflicts with previous selection information previously stored in said memory based on whether said first user defined file name of said selection information equals a previous user defined file name of said previous selection information; and (d2) storing said selection information in said memory if said selection information does not conflict with said previous selection information.

21. The method as claimed in claim 20, wherein said step (d) further comprises the step of:

(d3) preventing said selection information from being stored in said memory if said selection information conflicts with said previous selection information.

22. The method as claimed in claim 20, wherein said step (d) further comprises the steps of:

(d3) storing said selection information in said memory if said selection information conflicts with said previous selection information and said terminal device is operating in an overwrite mode; and (d4) preventing said selection information from being stored in said memory if said selection information conflicts with said previous selection information and said terminal device is operating in a non-overwrite mode.

23. The method as claimed in claim 22, wherein said step (d) further comprises the steps of:

(d5) displaying a message informing a user that said selection information conflicts with said previous selection information when said selection information conflicts with said previous selection information; and (d6) enabling said user to input one of an overwrite mode command and a non-overwrite mode command to said terminal device, wherein said overwrite mode command places said control means in said overwrite mode and said non-overwrite mode command places said control means in said non-overwrite mode.

* * * * *